United States Patent [19]
Paez

[11] Patent Number: 5,848,797
[45] Date of Patent: Dec. 15, 1998

[54] CHILD'S SAFETY SEAT FOR SHOPPING CART

[75] Inventor: Helene C. Paez, Pompano Beach, Fla.

[73] Assignee: Frank Paez, III, Pompano Beach, Fla.

[21] Appl. No.: 693,909

[22] Filed: Aug. 5, 1996

[51] Int. Cl.[6] .............................. B60N 2/26; A47D 1/10
[52] U.S. Cl. ............................. 280/33.993; 280/33.992; 297/256.17
[58] Field of Search ................... 280/33.992, 33.993, 280/33.999, DIG. 4; 297/256.15, 256.16, 256.17, 250.1, 238, 254; D34/26, 27

[56] References Cited

U.S. PATENT DOCUMENTS

| | | | |
|---|---|---|---|
| D. 357,105 | 4/1995 | Reiland et al. | D34/27 |
| 2,888,761 | 6/1959 | Miller | 280/33.992 |
| 3,023,047 | 2/1962 | Linden | 297/254 |
| 3,265,297 | 8/1966 | Behrens | 280/33.992 |
| 3,351,380 | 11/1967 | Sprague | 297/256.17 |
| 4,108,489 | 8/1978 | Salzman | 280/33.993 |
| 4,116,456 | 9/1978 | Stover et al. | 280/33.992 |
| 4,423,882 | 1/1984 | Stover et al. | 280/33.992 |
| 5,011,169 | 4/1991 | Henderson et al. | 280/202 |
| 5,048,736 | 9/1991 | Anatra | 280/33.992 |
| 5,056,865 | 10/1991 | Sedlack | 297/256.17 |
| 5,312,122 | 5/1994 | Doty | 280/33.992 |
| 5,330,250 | 7/1994 | Reyes | 297/256.16 |
| 5,427,432 | 6/1995 | Meeker et al. | 297/256.15 |

*Primary Examiner*—Brian L. Johnson
*Assistant Examiner*—Min Yu
*Attorney, Agent, or Firm*—Oltman, Flynn & Kubler

[57] ABSTRACT

A child's safety seat for attachment to the rear of a conventional shopping cart. The seat having closed sidewalls that do not allow for children to slide out from the seats. A U-shaped restraining bar wraps about the front of the seat and includes a release knob such as a bolt and depressible button on the exterior of the sidewalls which is child proof allowing only adults to release the child from the chair. Clamping cylindrical halves wrap about resilient gaskets to form a secure attachment to the handlebars of the shopping cart. The safety seat includes a pair of vertical height adjustable telescoping legs with swivel wheels underneath. The vertical legs can be attached to one another and be attached to legs on the shopping cart by a novel length adjustable sandwiching clasp. The invention can be performed from pre-injection molded plastic and the like and fits various sizes and types of conventional shopping carts.

21 Claims, 2 Drawing Sheets

CHILD'S SAFETY SEAT FOR SHOPPING CART

This invention relates to child seats, and in particular to a child's safety seat for being attached to the rear of a shopping cart.

BACKGROUND AND PRIOR ART

Grocery carts generally have upper basket areas for separating fragile and perishable supplies such as eggs and fruit from being bruised by the jostling of larger supplies such as liter bottles and six packs that may be stored in the main basket area. The upper basket area generally support a toddler or baby. However, using the upper basket for children causes several problems. First, the child would be occupying valuable storage space that would normally be occupied by the perishable and fragile food items. Second, the seated child would be able to easily reach into the interior of the upper and lower basket to grab and toss out various items from the grocery cart. Third, the handlebar area and adjacent frame area are the most touched portions of a shopping cart. As such large numbers of persons including those who are sick touch these areas of the shopping cart and pass along germs as a result. Fourth, the upper basket on generic shopping carts are not adjustable for various sized children. Thus, smaller children would be in danger of being improperly supported and could even fall out of the upper basket injuring themselves.

Various attempts have been made to modify the shopping cart but still do not overcome the problems described above. See U.S. Pat. Nos. 4,116,456 and 4,423,882 to Stover et al. Other devices have been proposed to add an additional seat to the rear of the shopping cart. However, these devices are elaborate contraptions that add more problems then solve. See for example U.S. Pat. 5,011,169 to Henderson et al. A shopping cart attachment was proposed in U.S. Pat. 5,312,122 to Doty. However, Doty does not have adjustable handrails that take into account the different sizes of children. Further, Doty has large V-shaped side openings that can allow children to fall out from.

Thus, the need exists to overcome the problems with the prior art devices.

SUMMARY OF THE INVENTION

The first objective of the present invention is to provide an easily attachable child's safety seat for a shopping cart.

The second object of this invention is to provide a shopping cart child's safety seat having an adjustable armrail for supporting and holding children of various sizes and ages.

The third object of this invention is to provide a armrail support for children using a shopping cart seat having a child proof release handle.

The fourth object of this invention is to provide a shopping cart child's safety seat having closed sidewalls for holding the child within the seat and not allowing the child's buttocks to slide sideways out of the safety seat.

A preferred embodiment has the novel child safety seat attached to the rear of a shopping cart. The safety seat includes a back, dual parallel closed sidewalls attached to the back, a base portion connected to the back and the sidewalls, an adjustable restraining bar for holding a child within the dual parallel closed sidewalls, and detachable cylindrical half sections for wrapping and clamping about a handlebar of the shopping cart. The cylindrical half sections can include a resilient form fitting gasket between. The safety seat includes first and second vertical legs parallel to one another, each having upper ends for attachment to the child's safety seat, and swivel wheels on each lower end of the first and the second vertical legs. Novel adapter linkages connect the cart to the vertical legs. A first connector plate has a first end attached to the shopping cart and a second end having a longitudinal through hole running therethrough. Top and bottom plates form a sandwich about a portion of the second end of the first connector plate and have an opposite end attached to each vertical legs. The plates are attached together by screws and bolts. The adjustable restraining bar includes a child safe release handle for allowing adults but not children to release and move the restraining bar respective the child's safety seat, the release handle chosen from one of a bolt, a depressible button. Each of the sidewalls includes indentations in a front portion for receiving an edge of the restraining bar. Each of the vertical legs includes a lower tube for telescoping into an upper tube and means for adjusting the telescoping position of the lower tube and the upper tube. Thus, the safety seat is adjustable for being attached to various types and sizes of shopping carts Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
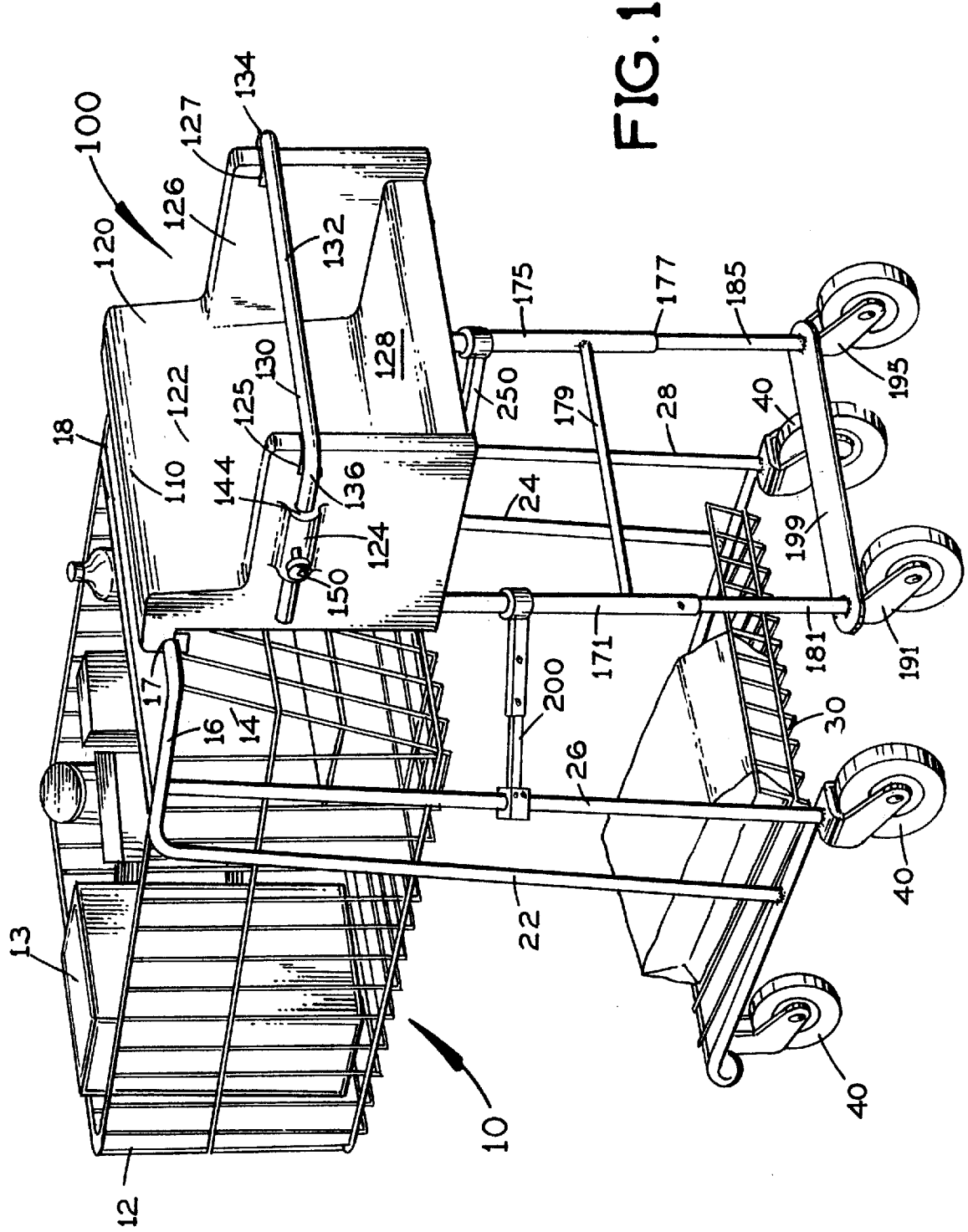
FIG. 1 is a perspective view of a preferred embodiment of the novel child's safety seat attached to a shopping cart.

FIG. 1 is a perspective view of a preferred embodiment 10 of the novel child's safety seat 100 attached to a shopping cart 10. Referring to FIG. 1 the novel invention is attached to conventional metal shopping cart 10 having main basket section 12 for holding grocery bags and food items 13, and small foldable basket section 14 for holding fragile and perishable food items. Cart 10 is supported by vertical legs 22, 24, 26, 28 which are attached to lower basket 30 which are attached to rotatable wheel assemblies 40. Cart 10 includes handlebar support arms 16, 18 connected to single handlebar 17 which is normally gripped by customers using cart 10. and is attached to the handle receiver 110 of the child's safety seat 100.

Figure 2:
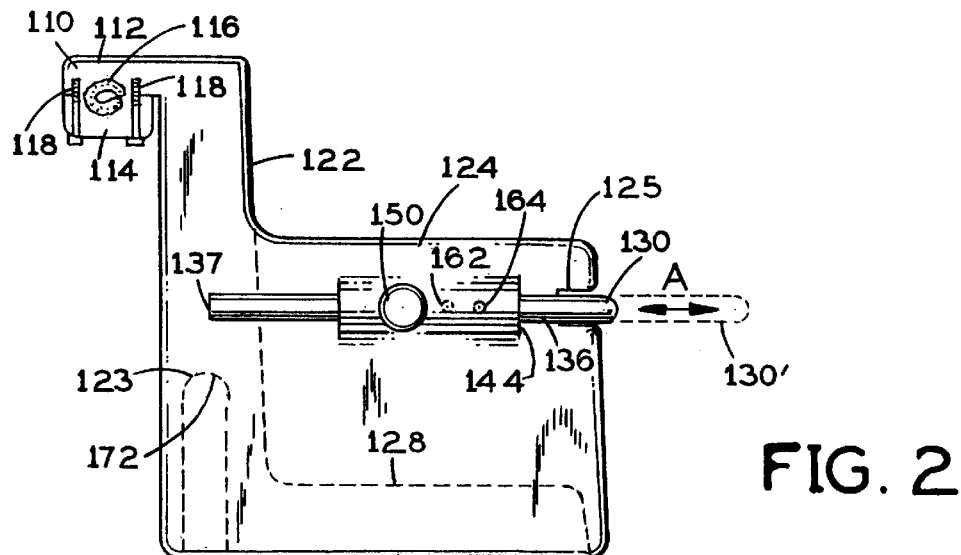
FIG. 2 is a side view of one half of the child's safety seat of FIG. 1 detached from a shopping cart.

FIG. 2 is a side view of half of the child's safety seat 100 of FIG. 1 detached from cart 10, whose components can be preformed from pre-injection molded plastic and the like. Referring to FIGS. 1 and 2, handle receiver 110 includes a top cylindrical half 112 and a bottom cylindrical half 114 that enclose a rubber gasket material 116 about handlebar 17 of cart 10. Cylindrical half sections 112, 114 are connected together and attach to handlebar 17 by fasteners 118 such as screws, bolts, and the like, wherein a screw 118 can be threaded through bottom half section 114 to top half section 112. The main seat 120 includes solid back portion 122 closed sidewalls 124, 126 and seat ledge portion 128 that can be pre-formed in a single piece. Sidewalls 124, 126 include indented grooves 125, 127 at the front of the seat for receiving front support bar 132 of seat restraint handle 130 which is movable in the direction of arrow A. Seat restraint handle 130 is generally U-shaped having side bars 136, 134 with detached ends 137(only one is shown) that pass through a hollowed out cylindrical support housing 144, 146 which is part of closed sidewalls 124, 126 of main seat 120. A child safe handle release 150 such as but not limited to a screw-able bolt, and the like can be located on both sidewalls 124, 126 to children seated in the safety seat 100 from releasing themselves. The handle release 150 such as a bolt tip can abut against the sides of the side bars 136, 134 or alternatively the side bars 134, 136 can include notches 162, 164 for receiving the tips of the bolts 150, which allows the restraint handle 130 to be further adjustable for different sized children.

Figure 3A:
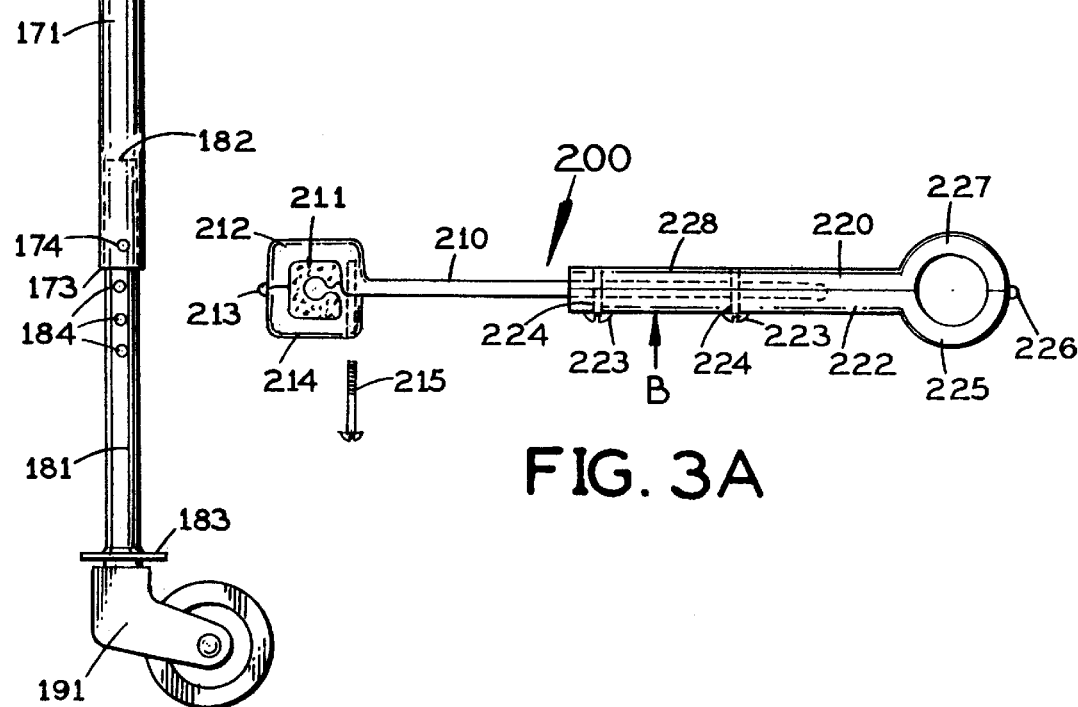
FIG. 3A is an enlarged view of the cart adapter linkage of FIG. 2.
Figure 3B:
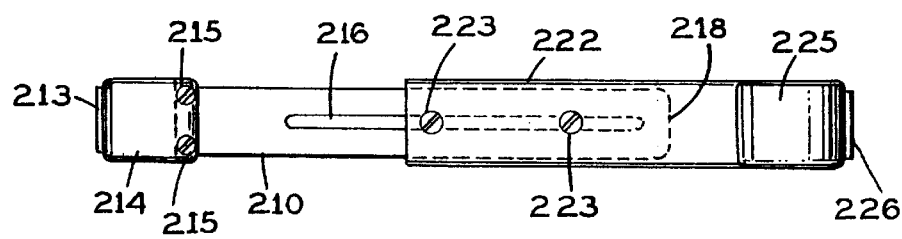
FIG. 3B is a top view of the cart adapter linkage of FIG. 3A along arrow B.

FIG. 3A is an enlarged view of the cart adapter linkage 200 of FIG. 2. FIG. 3B is a top view of the cart adapter linkage 200 of FIG. 3A along arrow B. Referring to FIGS. 1, 2, 3A and 3B, the safety seat invention 100 includes two parallel upper vertical hollow cylinder legs 171, 175 each having upper portions 172(only one is shown) that are each inserted into a socket 123(only one is shown) of the seat backing portion 122 and locked in place by heat molding, glue and the like. The upper vertical legs 171, 175 are attached adjacent their mid sections by a pair of structural cart adapter linkages 200 and 250 which each function alike. Linkage 200 includes a left plate 210 having a coupling end with top cylindrical half cover 212 connected by a hinge 213 to a bottom cylindrical half cover 214 and a rubber gasket material 211 therebetween. Fasteners 215 such as screws and the like, attach the hinged cylindrical half covers 212, 214 of the adapter linkage 200 about a leg 26 of shopping cart 10. The other end of plate 219 has a longitudinal opening 216 which is placed between a pair of sandwiched first and second plates 222, 224, and are connected to one another by hinged cylindrical halves 225, 227. The cylindrical halves 225, 227 of adapter linkage 200 wrap about upper vertical leg 171 of safety seat 100 by a hinge 226. A pair of screws 223, pass through respective openings 224 of first plate 222 into longitudinal opening 216 of left plate 210 and into threaded into interior side of second plate 228. Adapter linkage 250 functions in a like manner connecting upper leg 175 of safety seat 100 to cart 10. Upper vertical legs 171, 175 further include a horizontal bar 179 that separates and attaches the vertical legs 171, 175 to one another. Parallel upper vertical hollow cylinder legs 171, 175 have a lower open end 173, 177 for telescoping ends 182(only one is shown) of lower vertical tube cylinders 181, 185. Referring to FIG. 2, upper leg 171 has a fastener such as an inverted spring-loaded button, a bolt and the like which connects to one of the vertical openings 184 on the exterior of lower leg 181. The lower end 183 of lower leg 181 has a swivel wheel 191 attached thereto. The other upper leg 175 connects to a respective lower leg 185 and to a swivel wheel 195 in a similar manner. Referring to FIG. 1, a horizontal base support plate 199 connects and stabilizes the lower ends of lower legs 181, 185 together.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A child safety seat for being attached to the rear of a shopping cart, the safety seat comprising:

a backing portion;

dual parallel closed sidewalls substantially fixedly attached to the backing portion;

a seat base portion substantially fixedly connected to the backing portion and the dual closed sidewalls, such that the backing portion, sidewalls and seat base together form a non-collapsing seat structure;

an adjustable restraining bar for holding a child within the dual parallel closed sidewalls, and together forming a child's safety seat to the rear of a shopping cart the child safety seat is mounted separately behind a cart in such a way that the force to propel the cart is applied to the seat.

2. The child safety seat of claim 1, wherein the means for attaching includes:

detachable cylindrical half sections for wrapping about a handlebar of the shopping cart.

3. The child safety seat of claim 2, further including:

a resilient form fitting gasket between the cylindrical half sections.

4. The child safety seat of claim 1, further comprising:

first and second vertical legs parallel to one another, each having upper ends for attachment to the child's safety seat;

swivel wheels on each lower end of the first and the second vertical legs.

5. The child safety seat of claim 4, wherein the means for attaching includes:

first adapter linkage for connecting the first vertical leg to the shopping cart; and second adapter linkage for connecting the second vertical leg to the shopping cart.

6. The child safety seat of claim 5, wherein the first adapter linkage and the second adapter linkage each includes:

a first connector plate having a first end and a second end, the first end attached to the shopping cart, the second end having a longitudinal through hole running therethrough;

a top plate and a bottom plate parallel to one another, having a first end and a second end, the first end of the parallel plates forming a sandwich about a portion of the second end of the first connector plate, and the second end of the parallel plates attached to one of the vertical legs; and means for fastening the second end of the first connector plate to the first end of the parallel plates.

7. The child safety seat of claim 6, wherein the means for fastening includes a fastener chosen from at least one of:

a screw, and a bolt.

8. The child safety seat of claim 6, wherein the adjustable restraining bar includes:

a child safe release handle for allowing adults but not children to release and move the restraining bar respective the child's safety seat.

9. The child safety seat of claim 8, wherein the release handle is chosen from one of: a bolt, a depressible button.

10. The child safety seat of claim 8, wherein each of the sidewalls include:
   indentations in a front portion for receiving an edge of the restraining bar.

11. The child safety seat of claim 4, wherein the first and second vertical legs each includes:
   a lower tube for telescoping into an upper tube; and
   means for adjusting the telescoping position of the lower tube and the upper tube.

12. A child safety seat for being attached to the rear of a shopping cart, the safety seat comprising:
   a backing portion;
   dual parallel closed sidewalls substantially fixedly attached to the backing portion;
   a seat base portion substantially fixedly connected to the backing portion and the dual closed sidewalls, such that the backing portion, sidewalls and seat base together form a non-collapsing seat structure;
   an adjustable restraining U-shaped bar for holding a child within the dual parallel closed sidewalls, and together forming a child's safety seat;
   means for attaching the child's safety seat to the rear of a shopping cart;
   vertical supports attached to a lower surface of the safety seat; and
   swivel wheels attached to the vertical supports.

13. The child safety seat of claim 12, wherein the adjustable restraining bar includes:
   a child safe release handle for allowing adults but not children to release and move the restraining bar respective the child's safety seat.

14. The child safety seat of claim 13, wherein the release handle is chosen from one of:
   a bolt, a depressible button.

15. The child safety seat of claim 14, wherein each of the sidewalls include: indentations in a front portion for receiving an edge of the restraining bar.

16. A child safety seat for being attached to the rear of a shopping cart, the safety seat comprising:
   a backing portion;
   dual parallel closed sidewalls substantially fixedly attached to the backing portion;
   a seat base portion substantially fixedly connected to the backing portion and the dual closed sidewalls, such that the backing portion, sidewalls and seat base together form a non-collapsing seat structure;
   an adjustable restraining U-shaped bar for holding a child within the dual parallel closed sidewalls, and together forming a child's safety seat;
   clamping means for attaching the child's safety seat to the handlebars of a shopping cart;
   vertical supports attached to a lower surface of the safety seat; and swivel wheels attached to the vertical supports.

17. The child safety seat of claim 16, further comprising:
   first and second vertical legs parallel to one another, each having upper ends for attachment to the child's safety seat; swivel wheels on each lower end of the first and the second vertical legs;
   first adapter linkage for connecting the first vertical leg to the shopping cart; and
   second adapter linkage for connecting the second vertical leg to the shopping cart.

18. The child safety seat of claim 17, wherein the first adapter linkage and the second adapter linkage each includes:
   a first connector plate having a first end and a second end, the first end attached to the shopping cart, the second end having a longitudinal through hole running therethrough;
   a top plate and a bottom plate parallel to one another, having a first end and a second end, the first end of the parallel plates forming a sandwich about a portion of the second end of the first connector plate, and the second end of the parallel plates attached to one of the vertical legs; and
   means for fastening the second end of the first connector plate to the first end of the parallel plates.

19. The child safety seat of claim 18, wherein the means for fastening includes a fastener chosen from at least one of:
   a screw, and a bolt.

20. A child safety seat for being attached to the rear of shopping cart, the safety seat comprising:
   a backing portion;
   dual parallel closed sidewalls attached to the backing portion;
   a seat base portion connected to the backing portion and the dual closed sidewalls;
   an adjustable restraining bar for holding a child within the dual parallel closed sidewalls, and together forming a child's safety seat to the rear of a shopping cart;
   first and second vertical legs parallel to one another, each having upper ends for attachment to the child's safety seat;
   swivel wheels on each lower end of the first and the second vertical legs;
   wherein the means for attaching includes first adapter linkage for connecting the first vertical leg to the shopping cart; and second adapter linkage for connecting the second vertical leg to the shopping cart;
   wherein the first adapter linkage and the second adapter linkage each includes a first connector plate having a first end and a second end, the first end attached to the shopping cart, the second end having a longitudinal through hole running therethrough; a top plate and a bottom plate parallel to one another, having a first end and a second end, the first end of the parallel plates forming a sandwich about a portion of the second end of the first connector plate, and the second end of the parallel plates attached to one of the vertical legs; and means for fastening the second end of the first connector plate to the first end of the parallel plates;
   wherein the adjustable restraining bar includes a child safe release handle for allowing adults to release and move the restraining bar respective the child's safety seat.

21. A child safety seat for being attached to the rear of a shopping cart, the safety seat comprising:

a backing portion;

dual parallel closed sidewalls attached to the backing portion;

a seat base portion connected to the backing portion and the dual closed sidewalls;

an adjustable restraining U-shaped bar for holding a child within the dual parallel closed sidewalls, and together forming a child's safety seat;

means for attaching the child's safety seat to the rear of a shopping cart;

vertical supports attached to a lower surface of the safety seat; and swivel wheels attached to the vertical supports;

wherein the adjustable restraining bar includes a child safe release handle for allowing adults to release and move the restraining bar respective the child's safety seat.

* * * * *